(12) United States Patent
Englander (10) Patent No.: US 6,883,923 B2
(45) Date of Patent: Apr. 26, 2005

(54) RETRACTABLE REAR VIEW MIRROR

(75) Inventor: Benjamin Englander, Jamaica, NY (US)

(73) Assignee: Rosco, Inc., Jamaica, NY (US)

( * ) Notice: Subject to any disclaimer, the term of this patent is extended or adjusted under 35 U.S.C. 154(b) by 524 days.

(21) Appl. No.: 10/083,306

(22) Filed: Feb. 25, 2002

(65) Prior Publication Data

US 2004/0057132 A1 Mar. 25, 2004

Related U.S. Application Data

(63) Continuation of application No. 09/448,579, filed on Nov. 23, 1999, now Pat. No. 6,227,674.

(51) Int. Cl.[7] .............................................. G02B 7/182
(52) U.S. Cl. ...................... 359/879; 359/838; 359/839; 359/840; 359/841
(58) Field of Search ......................... 359/879, 838–840, 359/841, 850–853, 866–868, 871–872

(56) References Cited

U.S. PATENT DOCUMENTS

| 4,512,634 A | * | 4/1985 | Stout | 359/872 |
| 4,715,701 A | * | 12/1987 | Urban | 359/864 |
| 4,822,157 A | * | 4/1989 | Stout | 359/868 |
| 5,005,963 A | * | 4/1991 | Schmidt et al. | 359/868 |
| 5,237,459 A | * | 8/1993 | Strauss | 359/863 |

* cited by examiner

Primary Examiner—Mohammad Sikder
(74) Attorney, Agent, or Firm—Ostrolenk, Faber, Gerb & Soffen, LLP (57) ABSTRACT

A rear-mounted mirror assembly for trucks, vans and the like, for providing rear viewing as the vehicle is being backed up, for example, into a truck loading dock area. The mirror assembly comprises a mirror unit that is connected by a mirror arm to a support structure, e.g., a flange or bracket, that is fixed to the vehicle. The support structure projects minimally sideways of the vehicle and pivotably supports the mirror arm in a manner whereby the mirror unit and its arm can swing about a pivot axis, enabling the mirror and its arm to lie alongside a side wall of the vehicle or tightly against the rear of the vehicle. A return or rebound mechanism returns the mirror unit to its normal operational position, once contact with an obstruction that have pivoted the mirror unit from its normal position, has been removed.

23 Claims, 9 Drawing Sheets

RETRACTABLE REAR VIEW MIRROR

BACKGROUND OF THE INVENTION

The present invention relates to a rear mounted mirror assembly for motor vehicles and, more particularly, pertains to a rear mounted mirror assembly primarily for vehicles such as trucks, vans and the like that do not provide direct rear viewing as the vehicle is being backed up, for example, into a truck loading dock area.

The use of vehicle mirror devices is known in the prior art. Conventional vehicle mirrors are available and have been utilized for many years for the purpose of aiding the vision of drivers, when backing up their vehicles. These types of mirrors basically consist of familiar, expected and known structural configurations comprising a variety of differently shaped mirrors of various types that are mounted rigidly or hingedly, at forward locations or at the rear of the vehicles.

The prior art is exemplified by U.S. Pat. No. 5,825,564 to Mazarac, which mounts a mirror structure on a rear surface of the vehicle, in a manner which projects an image through a rear window of the vehicle to the rear view mirror located forward of the driver, inside the vehicle.

U.S. Pat. No. 6,302,550 to Krieg describes a rear mounted mirror assembly for motor vehicles, including a base member coupled to a rear panel of a motor vehicle. A pair of plates are provided, one of which is fixed to the rear surface of the vehicle, with the other being hingedly attached thereto and supporting a pole or telescoping arm to which a convex mirror is attached. The convex mirror can be pivoted to project sidewise of the vehicle, in a manner that projects an image of the space behind the vehicle to the front of the vehicle or, more specifically, to the side view mirror of the driver. Thereby, the driver is able to see other vehicles and obstructions when backing out of a parking spot.

A conventional style, side-view mirror which is attached to either the driver door or to the driver-side front fender is described in U.S. Pat. No. 6,239,928 to Whitehead, et al. That mirror is able to pivot about a pivoting axis, so that if it hits an obstruction, it does not break off. It is also provided with a plurality of detents at which its pivoting position can be fixed.

Conventional side-view mirrors are typically located near the driver, within hand reach. Or, they are adjustable electrically through remote operation. In any event, if such a side-view mirror is hit by an obstruction, or needs to be moved to accommodate a tight space, the driver can simply reach out and pivot the mirror body to avoid hitting obstacles. This is not easily done with rear mounted mirror assemblies that are mounted on a rear surface of a truck or van.

The present applicant is further unaware of any rear mounted mirror assembly that is capable of swinging out of the way when encountering an obstruction and thereafter automatically returning to its original position when the contact with the obstruction has ceased.

SUMMARY OF THE INVENTION

It is an object of the present invention to provide a simple to use rear mounted mirror assembly for mirror vehicles such as trucks, vans and the like.

It is another object of the present invention to provide a rear mounted mirror assembly that is simple and inexpensive to construct.

A further object of the invention is to provide a rear mounted mirror assembly that permits the vehicle to back up against a wall or the weather stripping surrounding the door of a loading dock, without causing damage to the mirror assembly or to the vehicle.

It is yet another object of the present invention to provide a rear mounted mirror assembly that is particularly suitable for backing up trucks or vans into tight spaces, such as those that are bound by a pair of sidewalls, whose separation is comparable to the width of the vehicle.

Yet another object of the invention is to provide a rear mounted mirror assembly that increases safety and facilitates driving.

The foregoing other objects of the invention are realized with a rear mounted mirror assembly in accordance with the present invention which comprises a mirror unit that is connected by a mirror arm to a support structure, e.g., a flange or bracket, that is fixed to the vehicle. The support structure projects minimally sideways of the vehicle and pivotally supports the mirror arm in a manner whereby the mirror unit and its arm can swing about a pivot axis, enabling the mirror and its arm to lie alongside a sidewall of the vehicle or tightly against the rear of the vehicle.

In accordance with further embodiments of the invention, the rear mounted assembly includes a return or rebound mechanism which automatically returns the mirror to a normal or original position when contact with an obstruction has ceased. Preferably, the mirror unit comprises a convex mirror and the mounting bracket is mounted to the driver-side, side wall of the vehicle and the mirror unit is so positioned that it is capable of reflecting an image from an area facing the rear wall of the vehicle to the driver-side, side-view mirror.

In accordance with further embodiments of the invention, the mirror arm is so shaped as to surround the perimeter of the mirror unit, so that obstructions make contact with the mirror arm, rather than with the mirror unit, so as not to disturb the positioning of the mirror unit relative to the arm. Still further embodiments of the invention incorporate into the mirror assembly electromechanical apparatus that senses the contact with an obstruction and automatically pulls the mirror assembly away from its normal position, as needed for protection. A further electromechanical mechanism is coupled to the electrical system of the truck or the van and pulls the rear mounted mirror assembly behind the truck or the van during normal driving conditions, in order to improve aerodynamics, avoid the mirror contacting tree branches, or other obstructions during normal driving conditions.

Other features and advantages of the present invention will become apparent from the following description of the invention which refers to the accompanying drawings.

DETAILED DESCRIPTION OF THE DRAWINGS

Figure 1:
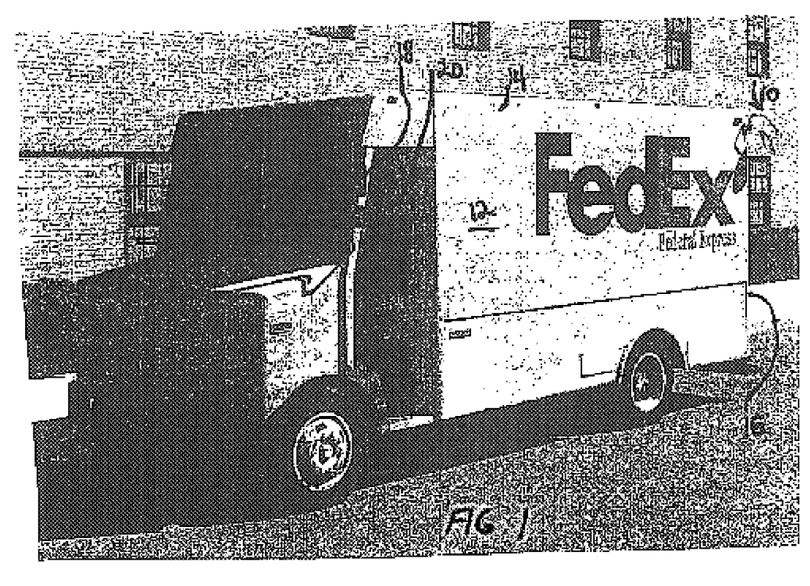
FIG. 1 perspectively shows a truck with the rear mounted mirror assembly of the present invention mounted thereto.
Figure 2:
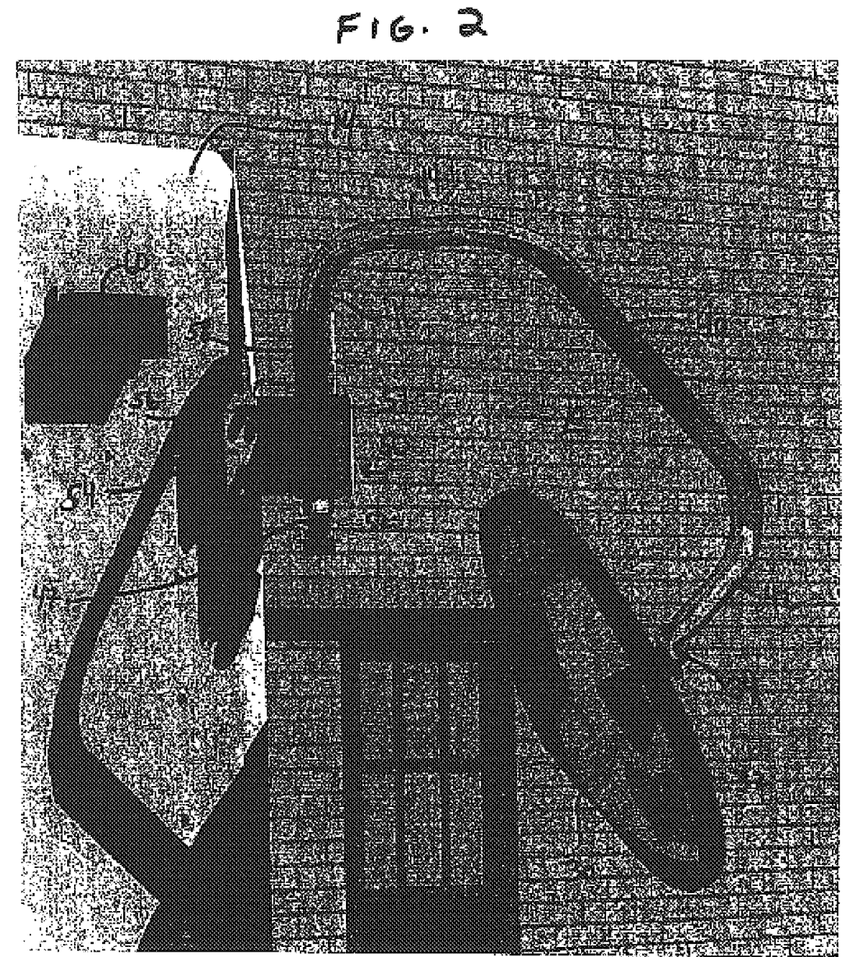
FIG. 2 is an enlargement of a portion of FIG. 1.

With reference to FIGS. 1 and 2, a rear mounted mirror assembly 10 for a vehicle 12 is shown mounted at or very close to the rear end, at the left hand side panel or wall 14 of the vehicle 12. An image reflected by the mirror unit 30, which shows the general space behind and to the sides of the vehicle 12 is reflected to the front mounted, side-view mirror 18, enabling the driver in the driver seat 20 to safely backup or to survey the environment in and about the rear panel or wall 16 of the vehicle 12.

The rear mounted mirror assembly 10 essentially comprises the mirror unit 30 which is swivelably attached to one end of a mirror support arm or pole 40, whose other terminal end 47 is rotatably or pivotably mounted in a bracket or flange 50. The bracket 50 is fixedly attached to the side wall 14 or to the rear wall 16 of the vehicle 12. The bulk of the rear mounted mirror assembly, including the arm 40 and the mirror unit 30, projects sideways and to the rear relative to the vehicle 12.

Some loading docks have U-shaped, foam-based weather strippings around the loading dock openings (not shown), against which a vehicle, such as the truck 12, backs up for making deliveries, enabling sealing the interior of the truck to the loading dock. This prevents the cold, rain or winter elements from affecting the interior of the loading dock. In any event, trucks sometimes need to back up very close against a solid wall. In all cases, the mirror assembly 10 of the present invention will interfere with the backing up operation against the weather stripping of loading docks or such rear walls.

In accordance with an essential feature of the present invention, the mirror assembly is outfitted with a mechanism that enables the mirror assembly structure to rotatably or movably yield to the pressure from the obstruction, in a manner which prevents the mirror assembly from breaking or distorting or from damaging surfaces of the vehicle or loading dock, etc. Essentially, the mirror assembly 10 rotates or pivots or moves out of the way of the obstruction. Secondarily, but not necessarily as an essential feature, the mirror assembly of the present invention also incorporated a mechanism which restores the mirror to its original, predetermined position once contact with the obstruction has ended.

With further reference to FIG. 2, the mirror unit 30 includes a circumscribing gasket or border 32 and a rear mounted pivotable screw mechanism 34 by which the mirror unit 30 is attached to the hole portion of the arm 40. The arm or pole has a first section 42 that bends into a second section 44 and bends again to form a third section 46 which comprises the terminal end of the arm which is pivotably received in the bracket 50. The bracket 50 has a main body portion 51 which defines an opening in which a sleeve 56 is located. The sleeve in turn rotatably holds the arm portion 46, which protrudes from the bottom of the bracket body 51, in a manner whereby the arm is normally resiliently biased to be pulled deeper into the opening by a spring 52. A flange portion 54 of the bracket 50 is affixed by a plurality of screws 56 or by welding or by any fastening means to the side wall 14 or, optionally, to the rear panel 16 of the vehicle 12. A shock-absorbing stopper or protector 60 assures that the mirror unit 30 will not be damaged or cause damage as it swings against the side wall 14 of the vehicle 12.

Figure 3:
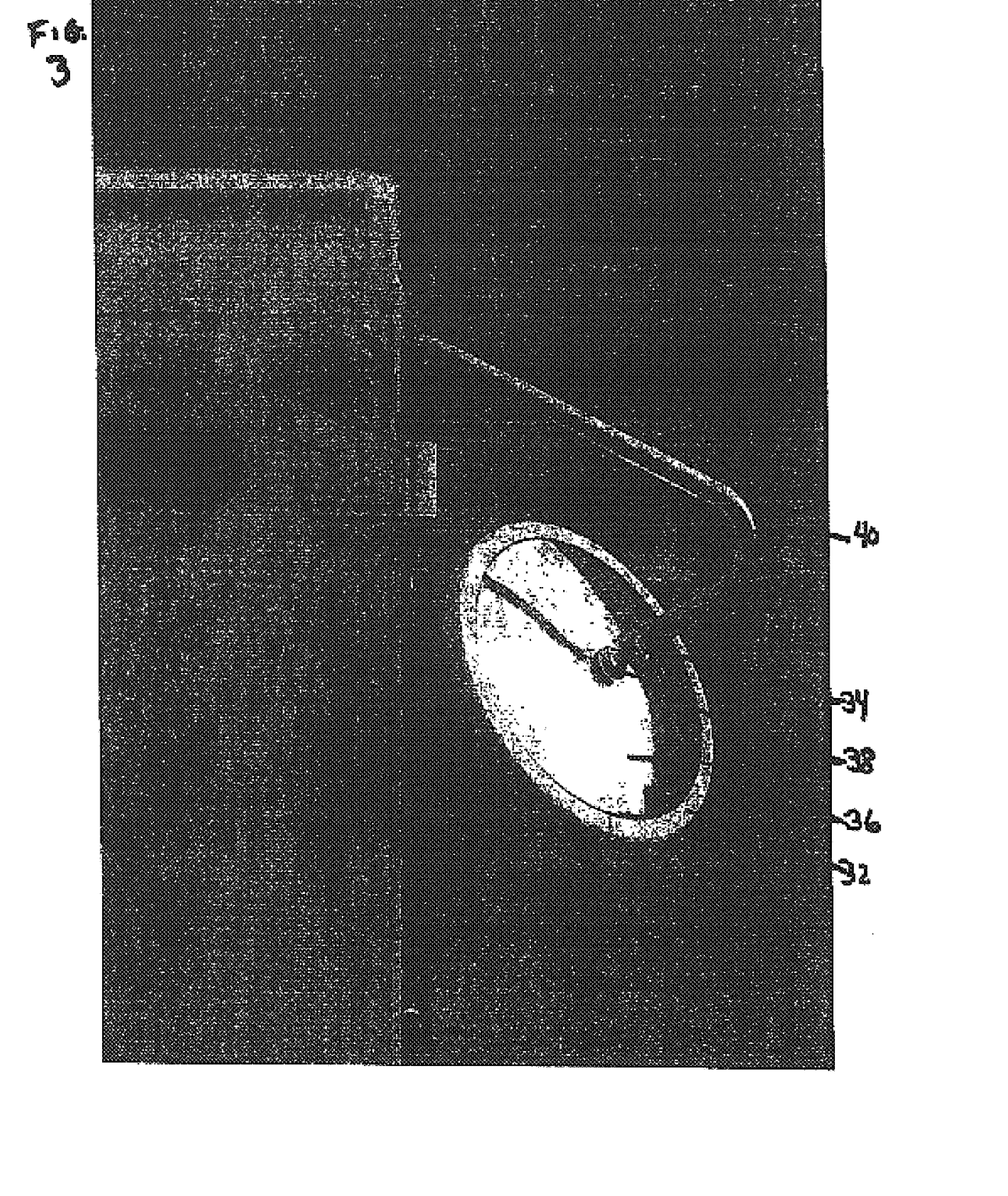
FIG. 3 is a further perspective showing a detail of the mirror support assembly of FIGS. 1 and 2.

FIG. 3 shows the ball and socket swivel arrangement 38 for the screw mechanism 34, which is mounted at the rear panel 36 of the mirror unit 30. Further illustrated is a detent 62 in the main body of the bracket 50, which engages a corresponding depression (not shown) in the terminal arm portion 46, to define a precise, predetermined, normal rotational position for the mirror arm 40.

In accordance with one important aspect of the present invention, the mirror assembly 10 of the present invention is provided with a return or rebound mechanism that automatically restores the arm and, therefore, the mirror unit 30 that it holds, to the normal position. The operation of such return mechanism is shown by reference to the somewhat differently constructed bracket assembly illustrated diagrammatically in FIG. 4. In this figure, the arm 40 is supported in a bracket that has a base piece 64 which, together with a cover piece 66, defined therebetween a cylindrical opening for the arm 40. The terminal end of the arm 40 extends beyond the cylindrical opening and is resiliently biased to pull the arm deeper into the opening by the normally compressed spring 52, which presses both against the terminal bottom side of the overall bracket and the protruding pin 72 that passes through the terminal end of the arm 40.

Figure 4:
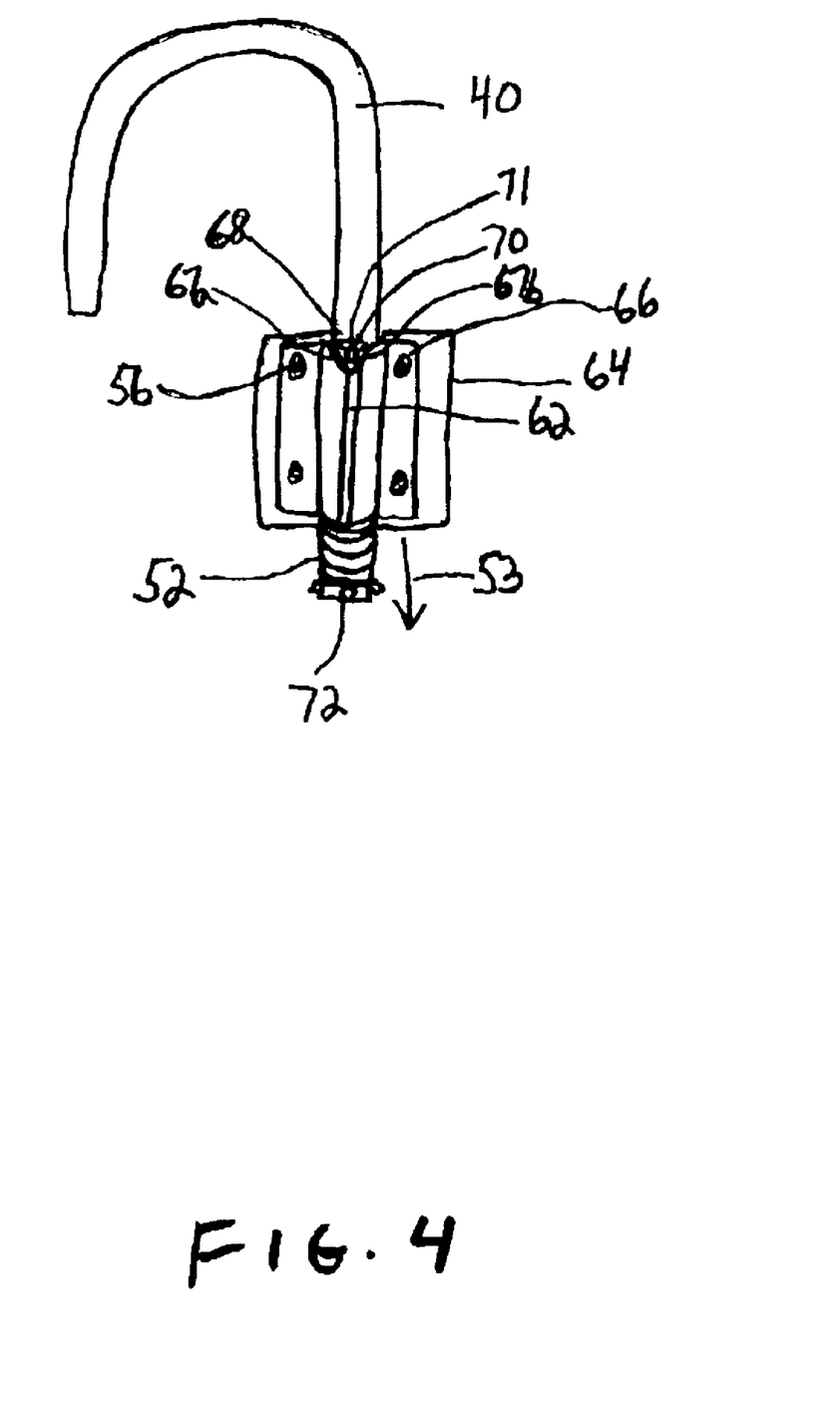
FIG. 4 provides a diagram of the mirror assembly of the present invention.

The downward biasing force of the spring 52 is restrained by a pin 70, which passes through the arm 40 above the bracket and which rests inside a V-shaped opening 68 that is defined in the cover piece 66 of the bracket.

Operationally, when the arm 40 is rotated in the cylindrical opening, the pin 70 bears tightly against the sloping surfaces 67a and 67b which define the V-shaped cutout in the bracket 66, causing the arm 40 to rise in the opening against the force of the spring 52. However, as soon as the rotational force on the arm 40 is removed, the counterforce exerted by the spring 52 in the direction of the arrow 53 causes the pin to rotate the arm 40 to restore the mirror's angular position to its original state.

Figure 5:
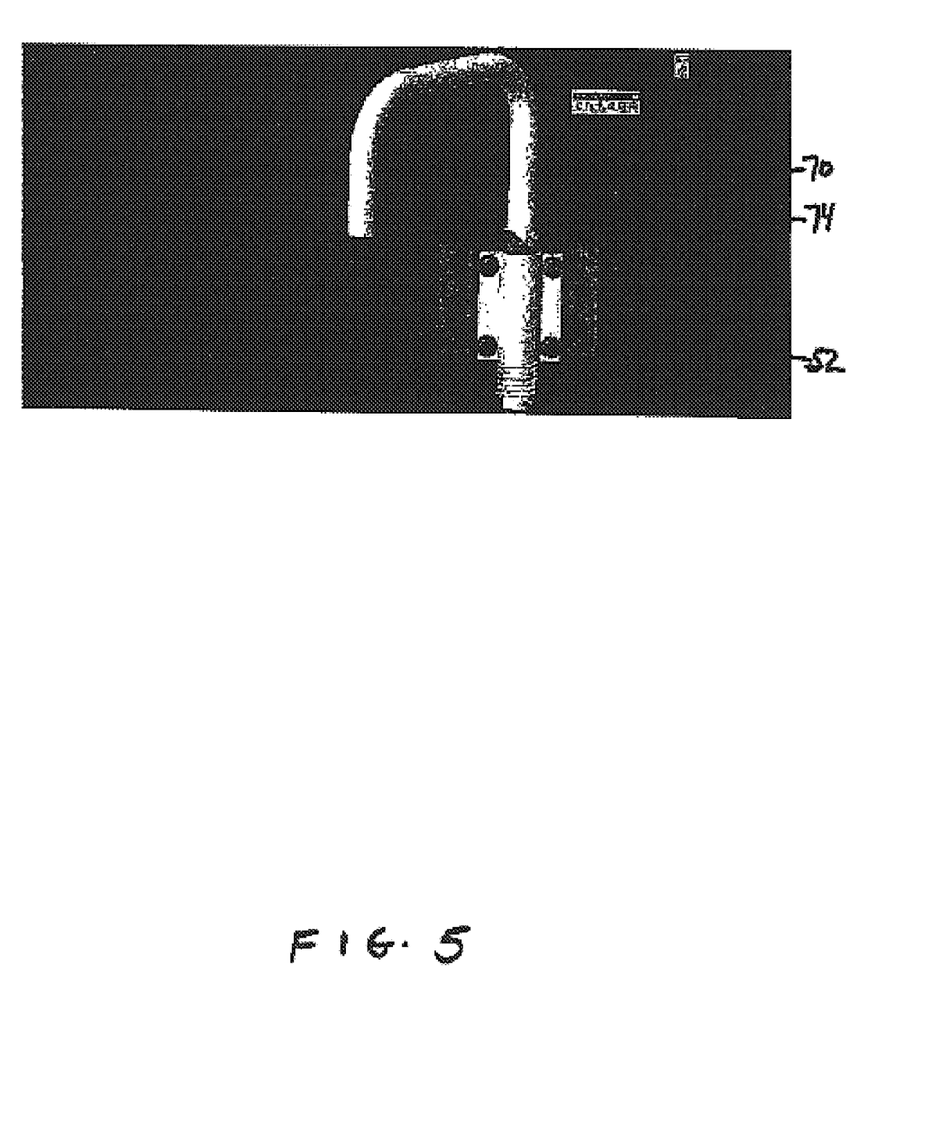
FIG. 5 is a further perspective showing a different embodiment for the construction of the bracket assembly for the mirror unit of the present invention.

The mounting bracket can be connected to the vehicle by a plurality of screws 56. Moreover, the normal position of the mirror 40 is precisely defined due to a detent and snap structure 62, whereby a portion of the arm snaps into a corresponding detent structure in the bracket. Also, the round pin 70 can be formed as an inverted triangle 71 to provide better traction and structural strength, and be so formed on the arm 40 as to complement the shape of the cutout 68. FIG. 5 shows the construction of FIG. 4, with the minor variant that the cutout 70 is provided in a separate sleeve portion 74.

Figures 6A, 6B:
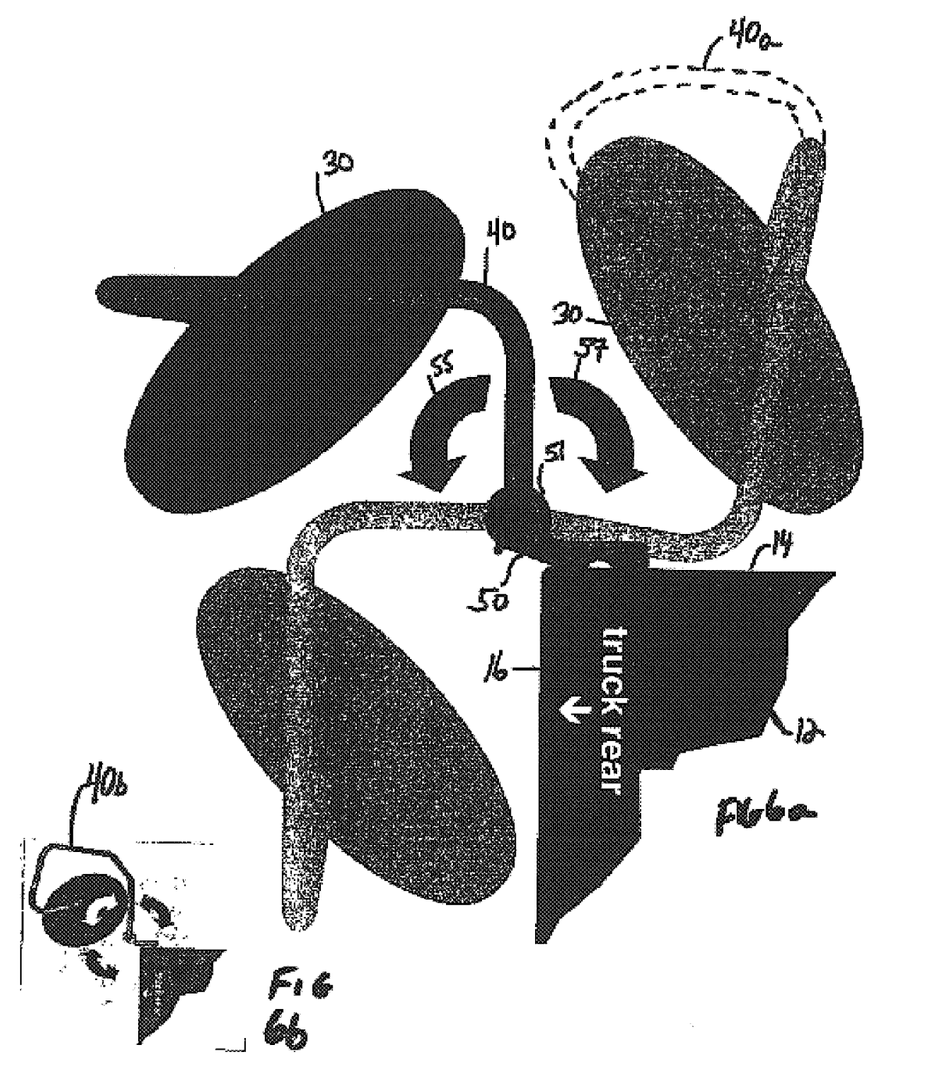
FIG. 6a is an illustration showing the range of movement of the mirror assembly of the present invention.
FIG. 6b shows a modified mirror arm shape for the mirror assembly of the present invention.

The range of pivoting movement of the mirror assembly 10 is illustrated in FIG. 6a, showing the mirror unit 30 against either the side panel 14 or the rear panel 16 of the vehicle 12. As shown, the mirror has a normal position at which it provides the optimal image that is reflected to the driver's side view mirror. Thus, if the truck 12 backs up against a solid wall, the mirror assembly is rotated clockwise in the direction of the arrow 57. indeed, an obstruction has the ability of pivoting the mirror arm to a degree that it could come to bear against the side wall of the side panel 14, protected by the resilient stopper, shown in FIG. 2. Thus, the entire mirror assembly can be pushed back due to its engagement with an obstruction, without breaking. However, as soon as the truck moves away from the obstruction, the mirror automatically snaps back or rebounds to its normal position. Similarly, if the mirror assembly engages or contacts a side wall, the mirror assembly can swing counterclockwise in the direction of arrow 55, whereby it becomes positioned behind the rear panel 16 of the truck 12.

Shown in dashed lines 40a is a somewhat differently shaped arm 40 for the mirror unit 30, which is so constructed that it partially, or substantially fully surrounds the mirror unit 30 in such a manner that in normal use, it is the arm, rather than the mirror unit 30 that engages the obstruction. This assures that the swivelably mounted mirror unit's position relative to the mirror arm will not be altered. FIG. 6b shows another variant, i.e., a differently shaped mirror bracket 40b.

Figure 7A:
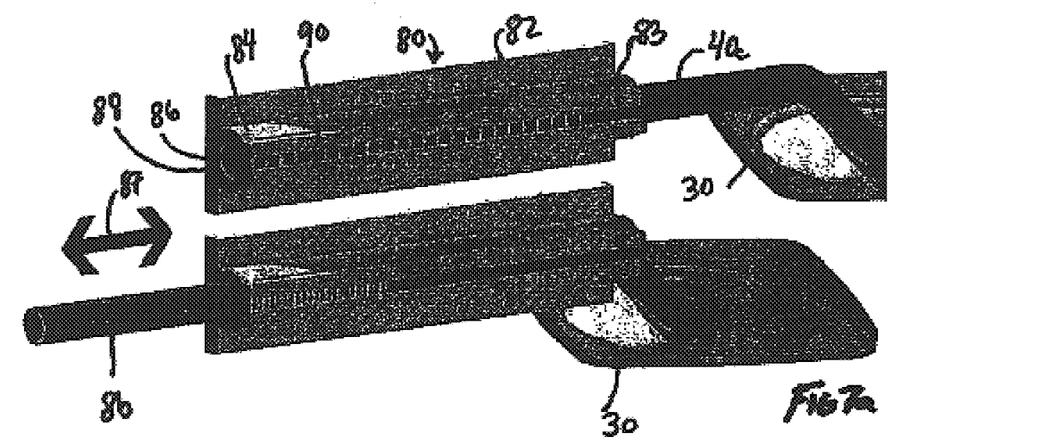
FIGS. 7a and 7b perspectively illustrate modified mirror arms and support brackets for the mirror of the present invention.

In the mirror assembly of the present invention shown in FIG. 7a, the differently shaped mirror arm 40c is slidingly (rather than rotatably) received in a slider bracket 80 which comprises a base 82, which is affixed to the vehicle by any known means (not shown), e.g., screws, etc. and which comprises and defines a cylindrical opening 88 in which the terminal portion 86 of the arm 40c slidingly received. In normal use, the arm 40c is biased outwardly by a spring 90 which bears against a pin 83, disposing the mirror assembly to the side and rear of the vehicle 12. However, if the mirror assembly unit 30 is pressed against an obstruction, the arm 40c exerts a force against spring 90, causing the terminal end 86 thereof to protrude and the mirror assembly to slide in until the rear of the truck, rather than the mirror, engages the obstruction. However, as soon as the obstruction force is removed, the mirror returns to its original position. The sliding motion of the mirror unit is indicated by the two-sided arrow 87.

Figure 7B:
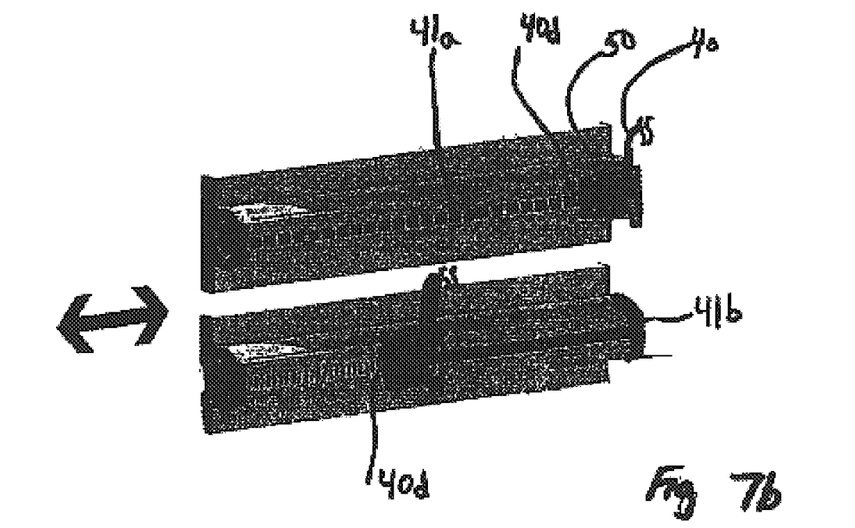

FIG. 7b illustrates the slider mechanism of FIG. 7a, except that instead of the arm 48 being received in the sliding cylinder, a short tubular bracket 40d affixed to the underside of the bracket 50 by a narrow web that is thinner than the opening 41a into the cylindrical channel 88, slides within the channel 88. The bracket is otherwise the bracket 50 of FIGS. 1 and 2. This enables the bracket which supports the arm 40 to slide in the structure 80 in the manner described above. Thus, the arrangement of FIG. 7b enables the mirror unit 30 to both rotate, as well as slide relative to the truck 12. The stopper 41b prevents the bracket 50 from sliding out of the channel 88.

In a further embodiment of the invention, a pair of parallel ones of the cylindrical opening 88 is provided in the slider bracket 80 and the bracket 50 is provided with a pair of the short tubes 40d, thus protecting the bracket 50 against twisting.

Figure 8:
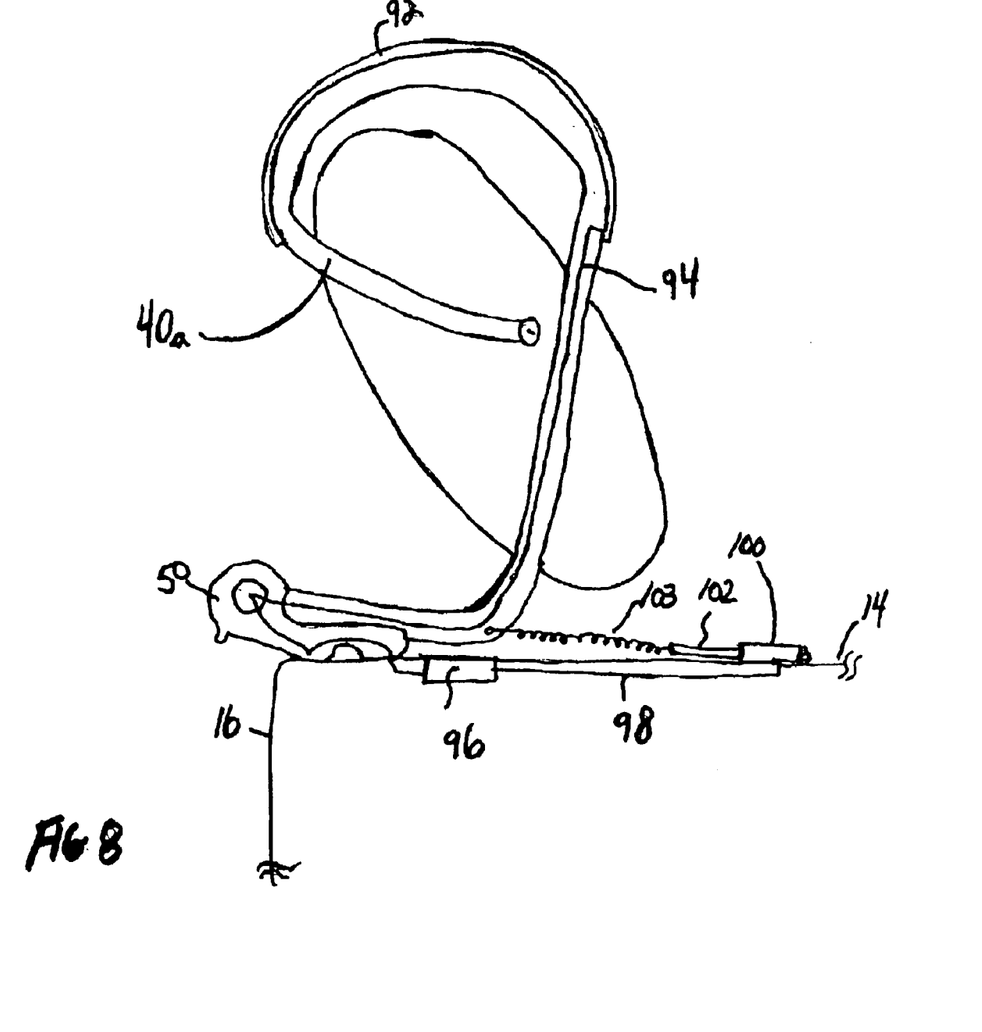
FIG. 8 shows an electrically actuatable rear mounted mirror assembly of the present invention, in accordance with another variation thereof.

FIG. 8 illustrates an electrically operable embodiment of the invention in which the overall mirror assembly is capable of being pulled back by an electrical mechanism comprising a cylinder or solenoid 100 that serves to pull the entire mirror assembly backward against the side panel of the truck 12. In this embodiment, the arm 40a is fitted with an electrical contact detector strip 92 which, whenever touched by any obstruction, sends an electrical signal over wire 94, which wire passes through the arm 40a into the bracket 50 and then to an electrical box 96 located on either side or inside the vehicle 12. The electrical mechanism 96 sends a signal over the wire 98 to the solenoid 100, causing its telescopic arm 102 to contract, and thus pull the arm 48, via a spring 103, against the force exerted in the bracket 50 to the position shown. As soon as contact with the obstruction is lost, the contact strip 92 removes its signal and the mirror rapidly returns to its original position.

Figure 9:
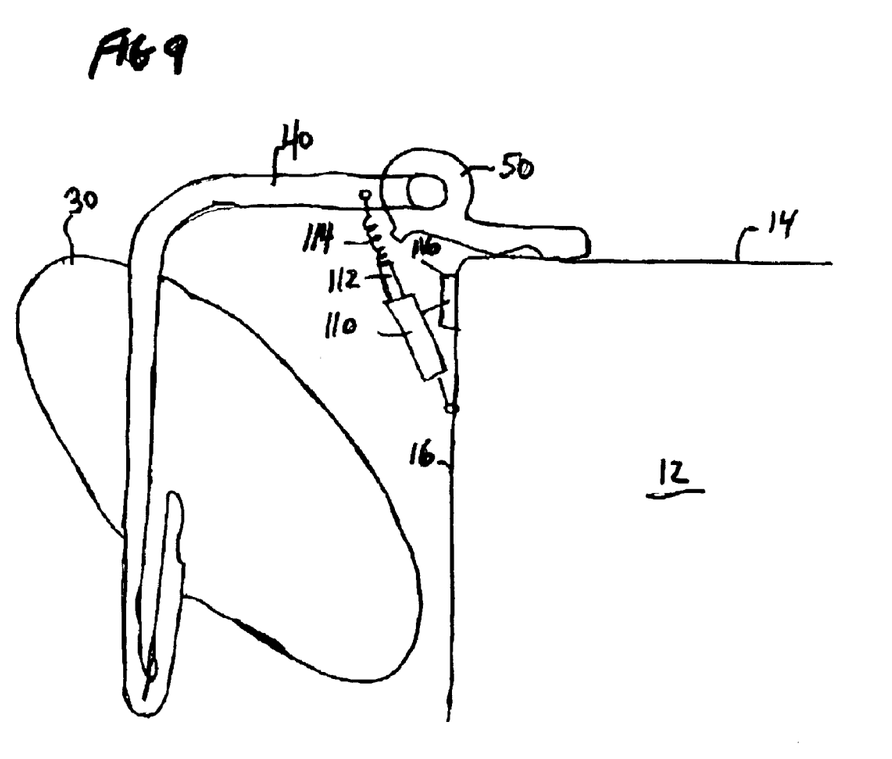
FIG. 9 shows a further electromechanical assembly for keeping the mirror unit of the rear mounted mirror assembly behind the truck during normal driving conditions to improve the aerodynamics and avoid hitting obstructions.

The electrical system described above is intended not to interfere with the ability of the mirror to swing not only alongside, but also behind the truck 12. The inventor herein also contemplates providing that arrangement in the rear of the truck and operate it so that the mirror unit is normally pivoted behind the truck during normal driving and is allowed to swing to its normal position only when the truck is operated in reverse gear. For this embodiment, the signal for operating the cylinder 110 (FIG. 9) that is located at the rear of the truck is provided to the electrical controller 116 from within the driver compartment or by tapping the reverse light signal or by placing a photoptical sensor over the backup light to produce such a signal, whereby only when the vehicle is being backed up is the mirror unit in its extended position. Thus, during the normal driving conditions, the cylinder 110 will be so energized through the telescoping arm 112 and the spring 114, as to pull the arm 40 toward the rear of the vehicle, improving the aerodynamics of the overall vehicle, and preventing the mirror unit from snagging tree branches or other obstructions. However, as soon as the vehicle is placed in reverse gear, the electrical controller 116 is so controlled that the cylinder removes its force and enables the arm 40 to rebound or snap back to what has been earlier termed as its "normal" position.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for facilitating driving of a vehicle, the system comprising in combination:
    a rear mounted mirror assembly and a vehicle body having front end, first and second side walls and a rear wall, the rear mounted mirror assembly comprising:
    a mirror arm having a mirror holding portion and a mounting portion;
    a mirror unit mechanically coupled to the mirror holding portion of the mirror arm; and
    a mounting bracket having a first portion that is fixed to the vehicle body adjacent to a region where the rear wall and one of the, first and second side walls of the vehicle meet, the mounting bracket having a mirror arm holding portion that defines a receiving opening in which the mounting portion of the mirror arm is pivotally supported, the mirror unit being so mounted that the mirror unit is at least partially disposed outwardly relative to both the first side wall and the rear wall of the vehicle with the mounting arm having a range of movement so that it can swing the mirror unit toward either the first side wall or the rear wall of the vehicle from a normal position of the mirror unit.

2. The system of claim 1, in which the mirror arm is sufficiently pivotable to locate the mirror arm and mirror unit adjacent either the first sidewall or the rear wall.

3. The system of claim 1, in which the mirror unit has a convex mirror surface.

4. The system of claim 1, in which the mounting bracket is mounted to the first side wall of the vehicle.

5. The system of claim 1, in which the mirror unit is so located that it is capable of reflecting an image from an area facing the rear wall of the vehicle to a first side view mirror that is mounted to the vehicle, adjacent a region thereof where a driver is seated.

6. The system of claim 2, including a stopper fixed to the vehicle body to cushion contact between the vehicle body and the mirror assembly, when the mirror assembly is pivoted away from its normal position.

7. The system of claim 1, further including a swivel connection mechanism that connects the mirror unit to a terminal end of the mirror arm.

8. The system of claim 1, further including a detent mechanism in the mounting bracket for defining a normal position for the mounting arm of the mirror unit.

9. The system of claim 1, in which the mounting arm is shaped to protect the mirror unit against contacting obstructions.

10. The system of claim 1, in which the mounting arm has at least three sections that are bent relative to one another.

11. The system of claim 1, including an electrically operable system for pivoting the mounting arm of the mirror from its normal position when an obstruction is electrically detected.

12. The system of claim 1, further including a return mechanism which is structured to exert a mechanical force on the mirror arm to return to the normal position.

13. The system of claim 12, in which the return mechanism comprises a spring mounted to exert a mechanical force between the mounting bracket and the mounting arm to rotate the mounting arm to the normal position.

14. The system of claim 13, in which the spring is mounted on a terminal portion of the mounting arm and the arm is provided with a pin that is designed to slide relative to a cutout in the bracket in a manner which restores the mounting arm to the normal position.

15. The system of claim 14, in which the cutout is V-shaped.

16. The system of claim 14, in which the pin is V-shaped.

17. The system of claim 14, further including a sleeve provided on part of the bracket and the cutout is provided in the sleeve.

18. The system of claim 1, in which the mounting bracket is mounted to the vehicle via an intermediate mounting hardware that enables the mounting bracket to slide relative to the first side wall of the vehicle in a direction toward the front end of the vehicle.

19. The system of claim 18, wherein the intermediate mounting hardware comprises a sliding channel in which a portion of the mounting bracket is slidingly received.

20. The system of claim 19, in which the sliding channel is comprised of a pair of adjacent and parallel channels and the mounting bracket comprises first and second portions which are slidingly received in the pair of sliding channels to enable the mounting bracket to resist twisting forces.

21. The system of claim 1, including an apparatus for maintaining the mirror unit behind the vehicle during the normal driving conditions when the vehicle is not being backed up.

22. A driving facilitating system comprising in combination, a rear mounted mirror assembly and a vehicle body having front end, first and second side walls and a rear wall, the rear mounted mirror assembly comprising:

a mirror arm having a mirror holding portion and a mounting portion;

a mirror unit mechanically coupled to the mirror holding portion of the mirror arm; and a mounting bracket fixed to the vehicle body adjacent to a region where the rear wall and one of the first and second side walls of the vehicle meet, the mounting bracket defining a sliding channel and the mirror arm being received in the sliding channel and being biased within the sliding channel to protrude toward the rear wall of the vehicle, but enabling the mirror arm and mirror unit attached thereto to slide toward the front end of the vehicle when the mirror unit is contacted by an obstruction.

23. The system of claim 22, in which the mounting bracket defines a pair of parallel sliding channels and the mirror arm comprises first and second portions that are received in the pair of sliding channels and slide therein a manner which resists twisting of the mirror arm.

* * * * *